Figure 1:
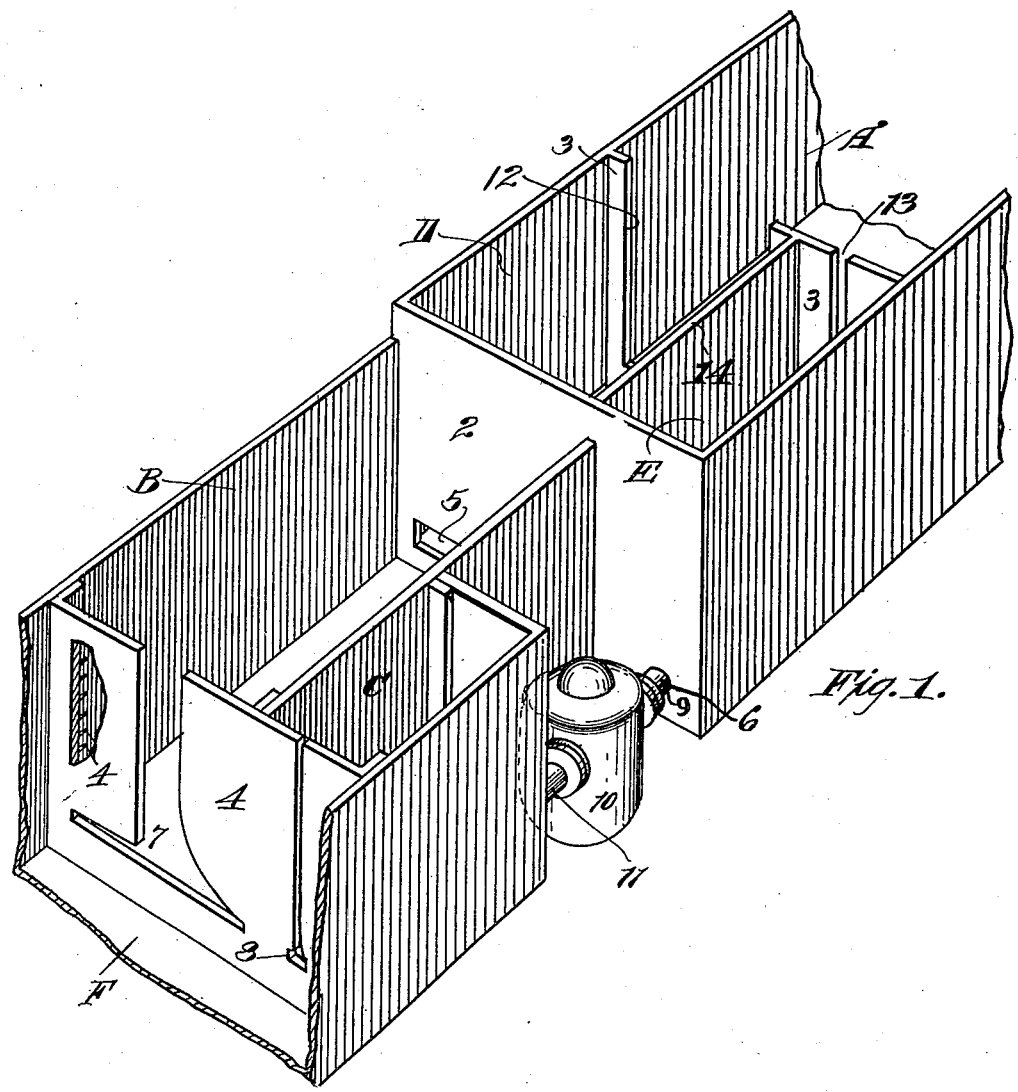

W. F. ENGLEBRIGHT.
APPARATUS FOR MEASURING AND REGISTERING WATER FLOW.
APPLICATION FILED SEPT. 28, 1912.

1,080,052.

Patented Dec. 2, 1913.
2 SHEETS—SHEET 1.

WITNESSES:
F. E. Maynard.
Frances V. Cole

INVENTOR
William F. Englebright,
BY G. H. Strong.
ATTORNEY

W. F. ENGLEBRIGHT.
APPARATUS FOR MEASURING AND REGISTERING WATER FLOW.
APPLICATION FILED SEPT. 28, 1912.
1,080,052.
Patented Dec. 2, 1913.
2 SHEETS—SHEET 2.
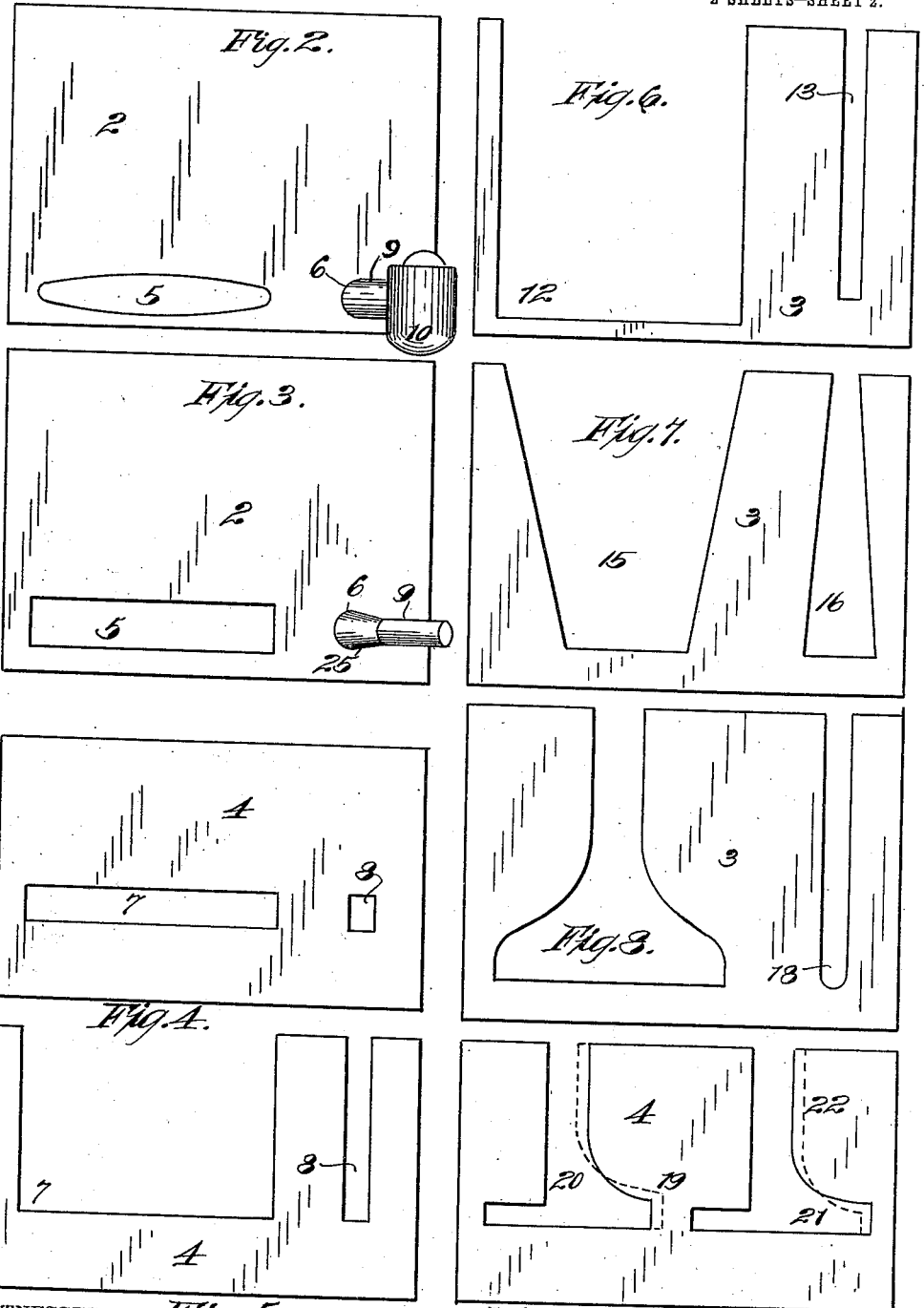
WITNESSES:
F. E. Maynard.
Frances V. Cole
INVENTOR
William F. Englebright,
BY G. H. Strong.
ATTORNEY

UNITED STATES PATENT OFFICE.

WILLIAM F. ENGLEBRIGHT, OF NEVADA CITY, CALIFORNIA.

APPARATUS FOR MEASURING AND REGISTERING WATER-FLOW.

1,080,052.  Specification of Letters Patent.  Patented Dec. 2, 1913.

Application filed September 28, 1912. Serial No. 722,946.

*To all whom it may concern:*

Be it known that I, WILLIAM F. ENGLEBRIGHT, a citizen of the United States, residing at Nevada City, in the county of Nevada and State of California, have invented new and useful Improvements in Apparatus for Measuring and Registering Water-Flow, of which the following is a specification.

This invention relates to water measuring apparatus, and particularly to an improved proportionate water measure.

The object of the present invention is to provide an improved means whereby the volume of water flowing in a stream may be proportionately divided, and by passing the smaller portion through a meter a reading is obtained whereby the total volume of water passing through the measuring apparatus during a given time is ascertained.

It is one of the special objects of this invention to devise a plate, dam or board, or plates, dams or boards, so placed with respect to each other, each plate, dam, or board having two discharge openings, to one of which openings there is connected a pipe; the opening or openings being of such configuration that under a rising and falling head the volume of water passing through the pipe at any time, will be in proportion to the volume of water passing through another opening in the same, or another dam, plate, or board or openings in a combination of two or more dams, plates, or boards, at the same time, and to a given ratio.

Heretofore there has been no satisfactory method of measuring under low heads the volume of large running streams of water when the volume of water increases, or decreases, during a given time. Satisfactory meters are being used for measuring the volume of water flowing through pipes during a given time; but if used to measure large quantities of water, the pipes and meters have to be of such large dimensions that the difficulty and cost of installing them makes their use prohibitive. If smaller pipes and meters are used the head or pressure required to run water through the pipe and meter is so large as to make their use prohibitive. By proportionally dividing the water into a larger and a smaller quantity and by having only the smaller quantity flow through the pipe and meter, both of these difficulties are overcome. Water pipe meters have also a defect to a greater or less degree in their rating, wherein, when running large or small quantities of water through the same meter, the registered volume of water does not differ in exact proportion to the actual volume of water passing through the meter.

The volume of water flowing through an opening in a vertical partition is calculated by the well known hydraulic formula, $$V = 8.03 AC \sqrt{H},$$

in which V=number of cubic feet of water per second. A=area of opening in square feet. H=head or depth of water above center of gravity of opening. C=a variable coefficient, determined by experiment and varying under different conditions with the head, size of openings and if the partition has material thickness with shape of edges of the opening. If the opening is submerged, H is taken for the difference in level between the surface of the supply and surface of the water into which the opening discharges.

One of the formulæ used for the calculation of the friction of water in pipes or volume of water flowing through a pipe under given conditions is, $$-V = 50 AK \sqrt{D \times H \div L},$$

in which V=number of cubic feet of water per second. A=cross section area of pipe in square feet. D=diameter of pipe in feet. H=head of water in feet. L=length of pipe and K=a variable coefficient determined by experiment varying with the head, diameter, length and roughness of the pipe.

It will be noted that these two formulæ have a common factor $\sqrt{H}$ or square root of the head and a common factor A or cross section area of pipe or opening, which permits the calculation of the proportional flow of water through an opening when compared with the flow of water into and through an opening and pipe combined.

A compound miner's inch weir is a combination of the two previously mentioned methods of measuring water. If an opening in a compound miner's inch weir is changed by slightly enlarging any part of the lower portion of the opening or contracting the upper portion of the opening, the result will be to change the proportionate flow through the opening, so that the volume of water flowing through the opening, in proportion to its depth, will be decreased as the quantity of water flowing through the opening is increased, to the contrary, if the lower portion of the opening is contracted or upper portion enlarged, the result will be that the proportionate volume of water flowing through the opening will be increased, as the volume flowing through the opening is increased; so that any discrepancies in the rating of a meter connected with a compound miner's inch weir can be corrected by slight changes in the shape of the opening. The general laws of hydraulics that would apply to the flow of water through water meters in pipes are also in some respects similar to the above.

After experimenting with the flow of water through openings, pipes and water meters and the same combined, I have devised a plate, dam, or board to be placed across a flowing stream, which may rise and fall, the volume of water flowing in which it is desired to measure during a given time. The plate, dam or board has a horizontal opening, and also a circular opening to which is connected a pipe; and supplied from or connected to the pipe is a water meter, the proportions of the openings being such that as the water rises or falls in the supply, the flow of water passing through the opening and pipe, or opening, pipe and water meter, will be approximately in proportion to that flowing through the other opening at any time, and to a given ratio. After obtaining from the reading of the water meter the volume of water flowing through the combined opening and pipe, or opening and pipe and meter, simple multiplication by the given ratio number gives the total volume of water passing through the apparatus during the given time. The formulæ previously mentioned for calculating the flow of water through pipes and openings contain as a factor a variable coefficient which is determined only by experiment, and is shown in actual practice by small discrepancies between the actual and calculated proportional flow of water through the opening and opening and pipe combined; or to the opening and opening pipe and meter combined. By the use of other plates, dams, or boards, properly placed with respect to each other, the dams, plates, or boards having suitable openings, the practical use of the apparatus is facilitated, and correction can be made for discrepancies of proportionate flow for varying conditions as well as for varying meter rating.

The invention consists of the parts and the construction and combination of parts as hereinafter more fully described and claimed, having reference to the accompanying drawings, in which—

Figure 1 is a perspective view of the apparatus. Figs. 2 to 9 inclusive, illustrate different forms of the discharge dams and other details.

I have experimented with and devised a form of measuring board or dam 2, Figs. 1, 2, and 3, in which there are openings for the discharge of water from the stream, flume, sluice or other supply source, indicated at A, from which it is desired to derive a measured volume of water or other liquid.

In the dam or board 2, Figs. 1, 2, and 3, there are two openings 5 and 6. The opening 5 is extended horizontally, and if the openings discharge into the air the opening 5 may be elliptical in shape, Fig. 2, and of the same height and level with the opening 6. The opening 5, if submerged, as when used in connection with an opening 7 in another plate or dam 4, Fig. 1, may be a rectangle 5, Figs. 1 and 3, or any shape, not here shown, provided the top of the opening 5 is below the bottom edge of the opening 7. The opening 5 discharges into the chamber B.

The opening 6 is a circle in shape; connecting to the opening 6, Figs. 1, 2, and 3, is a pipe 9, which, if smaller than the opening 6, is connected to the opening 6 by a taper piece 25, Fig. 3, in which event in making calculations in proportioning the apparatus, the taper piece 25 is considered as part of the thickness of the plate or dam 2, making beveled edges to the opening 6.

If the water passing through the opening 6 and pipe 7, discharges into the air, the center of the end of the pipe 9, Fig. 2, must be level with the center of the openings 5—6. Water flowing from the supply A through the opening 6 and pipe 9, may be discharged into any water measuring apparatus, as 10, Fig. 2.

Connected to the pipe 9 is a water meter 10, Figs. 1 and 2, which may be any satisfactory water meter that measures the volume of water flowing in a pipe, and of ordinary standard make, of a size to correspond with the diameter of the pipe. Connecting with the water meter 10 is the pipe 11 which connects with the chamber C.

Across the chambers B and C is placed the dam or plate 4, Fig. 1, in which are the openings 7—8. The dam or plate 4 with the openings 7—8 is used to hold back the water so as to submerge the openings 5—6, and to assist in proportioning the water to the required ratio, and also measure the volume of water passing through the opening at any time. The dam or plate 4 may be at the end of the apparatus when the openings 7—8 will discharge into the air, or the openings 7—8 may discharge into the chamber F and be partially submerged.

The openings 7—8 may be rectangles, Fig. 4, or weir notches, Fig. 5, or compound miner's inch weirs 7—8, Fig. 1, through which latter openings the volume of water flowing increases or decreases in direct proportion as the head increases or decreases and these are the openings preferred in the dam, plate or board 4. The width of the openings 7—8 are made proportionate to each other in the given ratio, so that the openings 7—8 will discharge the given proportionate quantities of water to each other when the water in the chambers B—C stands at the same height.

Projecting graduations 4' on the plate 4 show the depth of water in the chambers B—C, and indicate the volume of water flowing through the openings 7—8 at any time.

Having fixed a definite ratio in which it is desired to divide the water flowing from the supply A into two proportionate parts, the diameter of the opening 6 and the length and diameter of the pipe 9, and size of other connecting parts being given, the head required to discharge a certain quantity of water through the opening 6 in a certain time is calculated or ascertained by experiment. The head required to overcome friction in the pipe 9, or in the pipe 9 and meter 10, or other parts as 11, is calculated for the same quantity of water, or ascertained by experiment. The sum of these heads gives the head of water in the supply A or chambers D—E above the openings 5—6, required to discharge the said quantity of water through the opening 6. Having multiplied the volume of water passing through the opening 6 during a given time, by the ratio number, the area of the opening 5 is calculated so that the opening 5 will discharge the required amount of water under the same head as for the opening 5 and connecting pipes, etc. It will be found that with a rising and falling head in the supply A, the flow of water will then approximately be proportional through the openings 5—6 in the given ratio. The area of the opening 5 being ascertained, its length is calculated when height and shape are given.

As previously mentioned, small discrepancies will appear in the flow of water through the apparatus so far described; to correct these, another plate, dam or board 3, Fig. 1, is placed across the supply A and with the dividing piece 14 forms the two chambers D and E. In the plate or dam 3 are two openings 12—13, Fig. 1, connecting the supply A with the chambers D—E. The lower edges of the openings 12—13 may or may not be level with each other, as 12—13, Fig. 6, and their widths may or may not be proportional to other openings of the apparatus. The width of either or both of the openings 12—13 in the dam or plate 3, may be enlarged upward as 15, Fig. 7. The width of either or both of the openings 12—13 may be contracted upward as 16, Fig. 7, or 17, Fig. 8; or one of the openings 12—13 may be enlarged upward, 15, Fig. 7, and the other contracted upward 16, Fig. 7. The lower portion of either or both of the openings 12—13 may be curved as 18, Fig. 8.

As previously mentioned, discrepancies are found in the rating of water pipe meters. The reading is not in exact proportion to the actual amount of water passing through the meter, the reading being increased or decreased when large or small quantities are being measured, for the compensation of which, slight changes may be made in the shape of the opening 8 by enlarging any part of the lower portion of the opening, as dotted line 19, Fig. 9, or contracting the upper portion of the opening, as dotted line 20, Fig. 9, or by contracting any part of the lower opening dotted line 21, Fig. 9, or enlarging the upper portion of the opening as dotted line 22, Fig. 9, or by making similar changes in the openings 12—13 in the dam 3.

The operation of this apparatus and the effect of the combination of the different parts is as follows: Water flowing in the supply A, the volume of which may increase or decrease, will, by passing from the supply A through the openings in the dams or plates 3 and 2, or the openings in the dams and plates 2 and 4, or the openings in the dams and plates 3, 2, and 4, be divided into two parts proportional in the ratio used in designing and proportioning the different parts of the apparatus; the smaller portion being measured by a meter, the volume obtained therefrom, for any time, multiplied by the given ratio number gives the total volume of water passing through the apparatus for the same time. Water from the supply A flows through the openings in the plate or dam 3 into the chambers D—E. If the lower edges of the openings 12—13 in the dam 3 are at a sufficient distance below the lower edges of the openings 5—6, and the openings 12—13 are of sufficient width, as the amount of water increases or decreases in the supply A, no effect will be noted as to the depth of water in the chambers D—E by reason of the dam 3, and openings 12—13. If the lower edge of the opening 12 is raised or its width reduced in its lower portion, as 15, Fig. 7, the effect will be that when a small quantity of water is flowing from the supply A through the openings 12—13 the depth or head of water in the chamber D will be less than the depth in the chamber E, and the proportional volume of water flowing through the opening 5 to that flowing through the opening 6 will be decreased; but as the quantity of water flowing from the supply A is increased, the difference in the depths of water in the chambers D—E gradually disappears, and restores the proportionate flow of water through the openings 5—6 to the normal condition. If the width of the opening 12 is contracted upward as 16, Fig. 7, the effect will be that when a small quantity of water is flowing from the supply A through the openings 12—13 in the dam or plate 3, no difference will be noted in the depths of water in the chambers D—E, by reason of the dam 3. But when the volume of water flowing from the supply A is gradually increased, the effect of the water flowing through the different shaped openings will be that the depth or head in the chamber D, will become less than the depth in the chamber E, and the proportionate flow of volume of water through the opening 5 will become less than that flowing through the opening 6. Changing the position or shape of the opening 13 will give a reverse effect to that noted in changing the shape or position of the opening 12.

The dam, plate or board 3, with its openings 12—13 is used in combination with the openings 5—6 in the dam, plate or board 2, to assist in dividing the water from the supply A into two proportional parts and by changing the position of the bottom edge of either of the openings 12—13 or the shape of either of the openings 12—13, correction is made for differences in the proportional amount of water flowing through the openings 5—6, caused by a difference of effect of changing the head on the flow of water through openings under different conditions which will vary with different sized and different proportioned apparatus.

Water flowing in the chamber D flows through the opening 5 into the chamber B; passing to the chamber F, through the opening 7 in the dam 4. The water flowing in the chamber E passes through the opening 6 into the pipe 9, which may discharge into any measuring apparatus. As shown, the water flowing in the pipe 9 passes into and through the water meter 10, and through the pipe 11 to the chamber C.

If the plate or dam 4 is not used, the water flowing in the chambers B and C unites and passes on. If the plate or dam 4 is used, the water in the chamber C passes through the opening 8 in the dam 4, uniting with the water that passed through the opening 5, in the chamber F from which it passes on.

The area of the opening 5 in the dam 2 is arrived at or fixed by ascertaining the required head for a certain volume of water to pass through the opening 6 with a connecting pipe 9, or the opening 6 connecting pipe 9, meter 10 and pipe 11, and then making the area of the opening 5 such as to discharge a proportional amount of water at that head. The result is that the volume of water passing from the supply A through the chambers D—E, opening 5, and opening 6, with connecting pipes and meter to the chambers B—C, is divided into two parts in proportion in a desired ratio, the smaller portion passing through a water meter which gives the volume of water passing through it for any given period of time. For the purpose of submerging the openings 5—6 in the dam 2, and to again divide the water into two parts, proportional to the given ratio, the dam 4 with its openings 7—8 is used.

The division of the water into two parts proportional in a given ratio by the openings 7—8 in the dam 4 reflects up stream or backward and corrects inequalities in the proportional division of the water into two parts by the openings 5—6 in the dam 2, for if the water flows through the openings 7—8 in a definite proportion, it must flow through the openings 5—6 in the same proportion, and thus have the proper proportional part of the volume of water pass through the pipes and meter connected with the opening 6.

By changing the shape of the opening 8 in the dam 4, as indicated in Fig. 9, correction can be made in errors in volumetric indications. Usually when small volumes of water are being measured, meter dials do not indicate as large a volume of water as actually passes through the meter, which can be compensated for by slightly changing the shape of the opening 8, as 19—20 in Fig. 9. If the rating is to the contrary, correction can be made as 21—22 in Fig. 9.

Having thus described my invention, what I claim and desire to secure by Letters Patent, is—

1. In an apparatus for measuring and registering flowing water, a conduit, means for dividing the conduit into two chambers and having apertures for dividing flowing water into two parts of different proportions, a meter operated by the smaller portion and registering a proportional part of the total volume flowing through the conduit, said meter deriving its supply from the smaller aperture, a means for determining the volume of water flowing from said conduit at a given head, and an uppermost dam having apertures for preliminarily dividing the water to correct discrepancies in the proportional flow to the dividing means.

2. In an apparatus for measuring flowing water, a conduit, a dam in the conduit having large and small apertures dividing the water into parts of different proportions, a meter deriving water from the smaller aperture and registering a proportional part of the total volume of water flowing through the conduit in a given period of time, and a second dam having openings designed to discharge water in direct proportion to its head mounted in the conduit below the first named dam and controlling the flow of water therefrom.

3. In an apparatus for measuring flowing water, a conduit, a dam in the conduit having large and small apertures dividing the water into parts of different proportions, a meter deriving water from the smaller aperture and registering a proportional part of the total volume of water flowing through the conduit in a given period of time, and a second dam having openings designed to discharge water in direct proportion to its head mounted in the conduit below the first named dam and controlling the flow of water therefrom, said second dam having apertures having a ratio approximately that in the first dam.

4. In an apparatus for measuring flowing water, a conduit, a dam in the conduit having large and small apertures dividing the water into portions of different proportions, a meter deriving water from the smaller aperture and registering a proportional part of the total volume of water flowing through the conduit in a given period of time when an average rate quantity of water passes through it, said meter having a rating so that when larger or smaller quantities of water pass through it, it registers different inaccurately proportionate quantities, and a correcting dam having openings designed to control the flow of water through the meter, the openings being so shaped as to have a rating inverse to the meter rating.

5. In an apparatus for measuring flowing water, a conduit, a dam in the conduit having large and small apertures dividing the water into parts of different proportions, a meter deriving water from the smaller aperture and registering a proportional part of the total volume of water flowing through the conduit in a given period of time, and a second dam mounted in the conduit below the first named dam and controlling the flow of water therefrom, said second dam having apertures having a ratio approximately that in the first dam.

6. In an apparatus for measuring flowing water, a conduit, means for dividing the conduit into chambers and having apertures for dividing flowing water into two parts of different proportions, a meter operated by the smaller portion and registering a proportional part of the total volume flowing through the conduit, an uppermost dam having apertures for preliminarily directing the water to correct discrepancies in the proportional flow through the dividing means, and a lowermost dam mounted in the conduit below said dividing means for controlling the flow of water therefrom, said lowermost dam having apertures with a ratio approximating that of those in the uppermost dam.

In testimony whereof I have hereunto set my hand in the presence of two subscribing witnesses.

WILLIAM F. ENGLEBRIGHT.

Witnesses:
 JOHN H. HERRING,
 W. W. HEALEY.

---

Copies of this patent may be obtained for five cents each, by addressing the "Commissioner of Patents, Washington, D. C."